United States Patent [19]

Novello et al.

[11] 4,174,007
[45] Nov. 13, 1979

[54] MACHINE FOR THE PRODUCTION OF SHAPED PARTS

[75] Inventors: Renzo Novello, Manzano; Elvio Bottussi, Medeuzza, both of Italy

[73] Assignee: Novello Fratelli S.p.A, Udine, Italy

[21] Appl. No.: 867,598

[22] Filed: Jan. 6, 1978

[30] Foreign Application Priority Data
Jul. 15, 1975 [IT] Italy .......................... 83407A/75

Related U.S. Application Data

[63] Continuation-in-part of Ser. No. 705,152, Jul. 14, 1976, abandoned.

[51] Int. Cl.$^2$ ........................... B27C 9/04; B27C 5/00
[52] U.S. Cl. ..................................... 144/1 R; 83/628;
409/79; 144/116; 144/130; 144/136 R;
144/142; 144/144 R; 144/245 R; 144/246 R;
144/326 R
[58] Field of Search ................. 83/628; 144/3 R, 3 E,
144/3 B, 3 T, 1 R, 8, 130, 134 R, 326 R, 39, 137,
142, 144 R, 116, 245 R, 246 R, 136 R; 90/13 R,
1 S, 21 R

[56] References Cited

U.S. PATENT DOCUMENTS

| | | | |
|---|---|---|---|
| 3,833,033 | 9/1974 | Horn | 144/3 R |
| 3,934,630 | 1/1976 | Cockle | 144/3 R |
| 3,960,041 | 6/1976 | Warren et al. | 144/39 X |

Primary Examiner—Robert L. Spruill
Assistant Examiner—W. D. Bray
Attorney, Agent, or Firm—Blanchard, Flynn, Thiel, Boutell & Tanis

[57] ABSTRACT

Machine for fabricating shaped parts, such as chair legs in particular, into which the parts to be shaped are positioned by means of a suitable loader. The parts are moved along a substantially straight path and movable tools are movable at right angles to the course of movement of the parts. The movement of the tools is guided by a suitable means that is indexed to the profile of the finished parts. The tools may be cutters or abrading tools.

11 Claims, 6 Drawing Figures

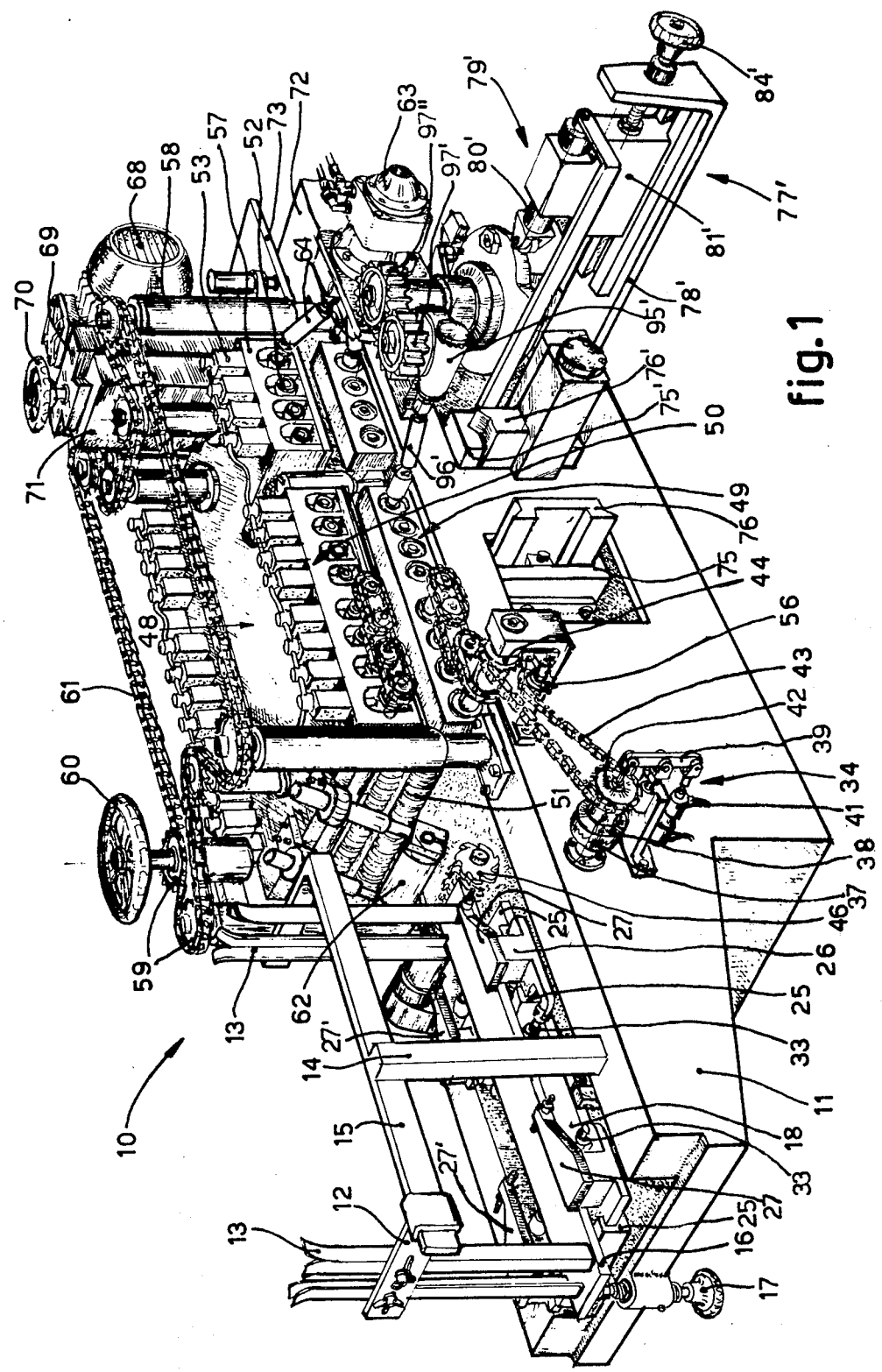

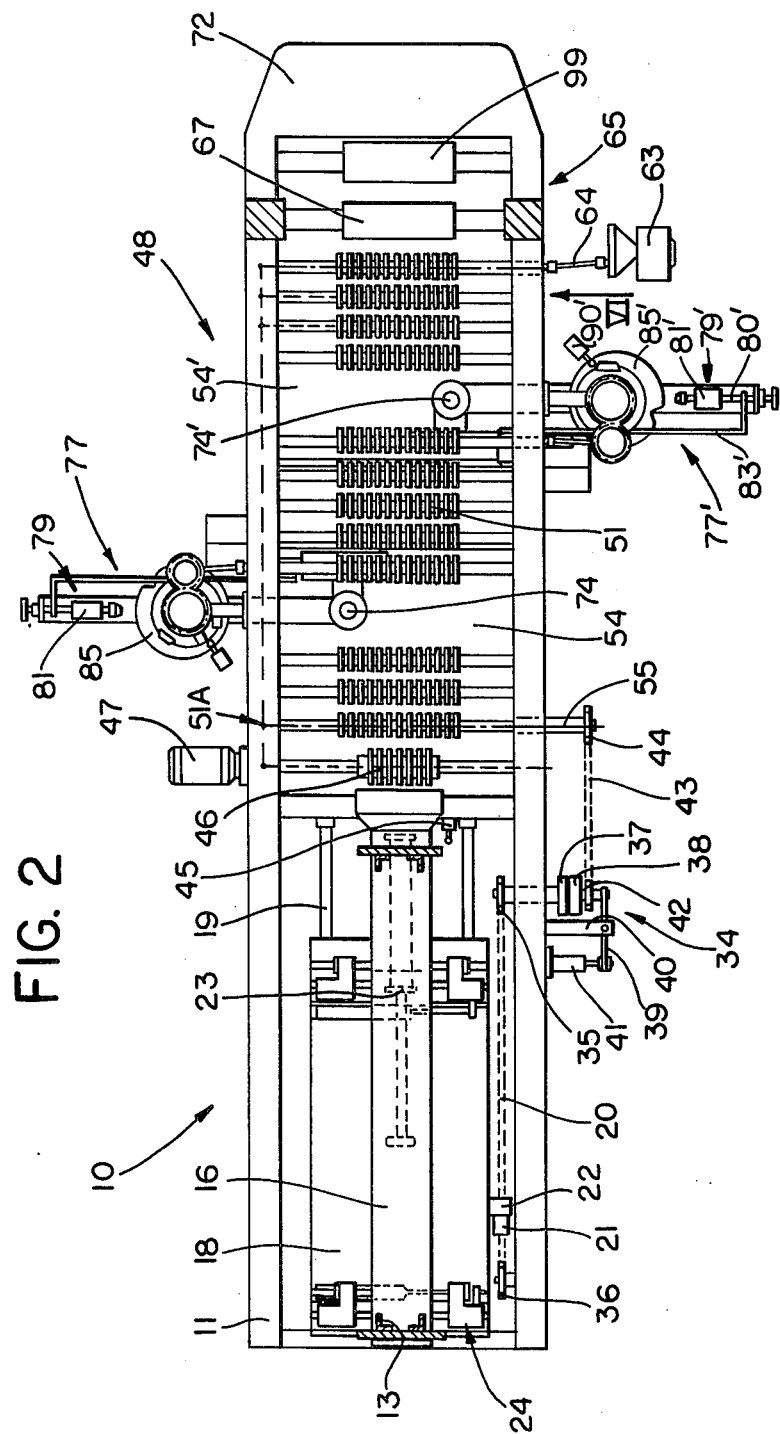

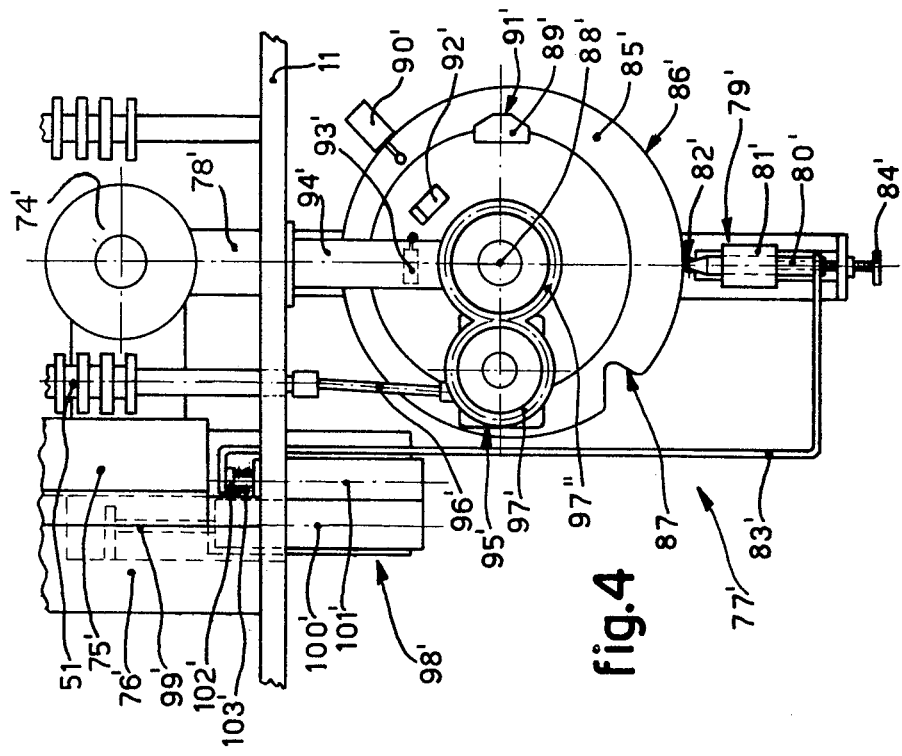
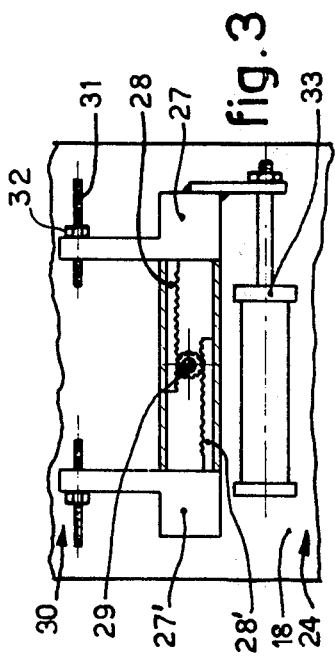

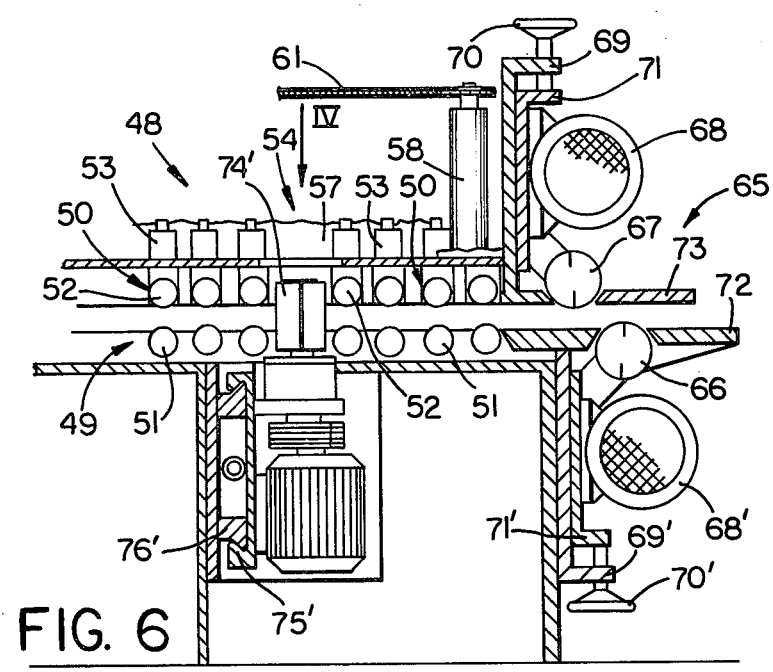

MACHINE FOR THE PRODUCTION OF SHAPED PARTS

CROSS REFERENCE TO RELATED APPLICATION

This is a continuation-in-part application of Ser. No. 705 152, filed July 14, 1976, now abandoned.

FIELD OF THE INVENTION

The present invention relates to a machine for fabricating shaped parts, and more specifically chair legs.

BACKGROUND OF THE INVENTION

The prior art machines have had several disadvantages. One of the principal disadvantages lies in the fact that a template is required for each workpiece and this involves a union of the workpiece to the template, and the union of the two elements to the machine. This also requires a storage of the templates.

Another disadvantage of the prior art machines resides in the fact that the workpiece had to be worked or planed on two sides to provide supporting services for the template. After finishing of the two sides, the opposite sides had to be planed; in addition, the template had to be positioned in the machine.

A third disadvantage of the prior art machines resides in the difficulty in obtaining a template, and the deterioration and wear thereof because of its heavy weight. In addition, excessive manual work was involved in the individual operations of loading and unloading the workpieces.

The present invention is an improvement over the prior art in that it provides an automatic machine for producing shaped parts, which greatly reduces the manual operations of loading and unloading the workpieces.

It is an object of this invention to provide a machine that eliminates the use of movable templates that have to be united with the workpiece to be processed.

It is a further object of this invention to provide a device that includes an indexing means for providing the final structure of the workpiece.

Our machine is, thus, an improvement over the prior art machines in that it increases the productivity of the machine. The fact that it is reversible ensures less wear on the machine parts. In addition, our novel machine avoids the necessity of planing and molding the workpiece prior to its being positioned in the machine. Our novel invention is also advantageous over the prior art in that it has linked the forward movement of the workpiece to the position of the tools. In accordance with the invention, the aforesaid results are obtained by providing in combination a guiding bench, served by a loading device. Our processing tools move at right angles to the workpiece and are controlled by a device that is indexed to the profile of the finished workpiece. A preferred embodiment is illustrated in the drawings, which illustration is provided for exemplificative purposes only.

BRIEF DESCRIPTION OF THE DRAWINGS

Referring now to the drawings,

FIG. 1 is an overall view of the machine of our invention embodying the invention;

FIG. 2 is a top view of the machine;

FIG. 3 is an end view showing the clamping device for the loader;

FIG. 4 is a top view showing the indexing means taken in direction of the arrow IV in FIG. 6;

FIG. 5 is a top view of an alternate indexing means; and

FIG. 6 is a partially sectioned side view of a portion of the machine shown in FIG. 1 as viewed in the direction VI in FIG. 2.

DETAILED DESCRIPTION

In the figures corresponding parts performing the same functions have been given the same reference numbers.

With reference to FIG. 1 and the subsequent figures, we have the following: A loading device 10 is mounted on the frame 11 of the machine for loading the workpieces. The adjustable supports 12 and 13 for the workpieces are held in place by the upright member 14 and beam 15. The loading device includes a platform member 16 which extends to the planing and grooving tools 46 described in more detail below and slidably supports the workpieces thereon. The platform 16 is adjustable vertically by means of a handwheel and threaded shaft 17.

A movable platform member 18 has a plurality of clamping elements 24 (FIG. 2) thereon which slides an elongated guide rods 19 and is pulled during this movement by the chain 20 anchored to a protrusion 22 on the platform member by a lug 21. Its return movement, on the other hand, is effected by means of the cylinder and piston unit 23. The clamping elements 24 for holding and centering the workpiece move at right angles to the longitudinal axis and direction of movement of the platform member 18 on guides 25 and 26 secured to the platform member 16. Jaws 27-27' are mutually connected by means of the racks 28 and 28' (FIG. 3) and intermediate gear 29. The jaws 27-27' are provided at their top with adjustment elements 30 to adjust their grip and consist of a threaded rod 31 and lack nut 32. The cylinder and piston unit 33 drives the jaws 27-27'.

A drive arrangement 34 transmits motion to the chain 20 by means of a drive gear 35, said chain 20 enterconnecting the drive gear 35 and a transmission idler gear 36 as shown in FIG. 2. A drive coupling member 37 is rigidly connected to and axially aligned with the gear 35. A coupling member 38 is coaxial with the coupling member 37 and moves axially by means of a lever 39 pivoted at 40 and connected to the cylinder and piston unit 41 into and out of intermeshing relation with the coupling member 37. A gear 42 is situated coaxially with the coupling member 38 and is connected by means of a chain 43 and gear 44 to a roller 55 of an entraining, guiding and processing bench 48. A microswitch 45 (FIG. 2) controls the hydraulic circuits of the cylinder and piston units 23, 33 and 41. The planing and grooving means 46 consist of axially spaced cutters rotatably driven by a motor 47. The entraining, guiding and processing bench 48 consists essentially of a lower group 49 of grooved rollers 51 and an upper group 50 of smooth rollers, both groups of rollers rotating together. Each of the rollers 51 is driven through a not illustrated and conventional driving connection by the motor 63, however, one roller 51 is illustrated as being driven in FIG. 2 by the articulated drive shaft 64 and the schematically illustrated transmission 51A. The rollers 51 of the lower group 49 have their grooves cooperating with the cutters of the planing and grooving means 46, while the rollers of the upper group 50 are mounted on bearings 52 and are urged downwardly by means of the controlled-pressure cylinder and piston units 53 (FIGS. 1 and 6). The shaft 55 of the lower group 49 provides the motion that is supplied to the drive arrangement 34 by means of the chain 43 whose tension can be adjusted with the idler gear 56 (FIG. 1).

A block 57 supporting the rollers of the upper group 50 is movable vertically. The threaded screw and sleeve couplings 58 support and effect a vertical positioning of the block 57. A handwheel 60 (FIG. 1) having a sprocket rotatable therewith activates a chain 61 engaged with the sprocket. The chain 61 cooperates with a sprocket 59 connected to the threaded screw and sleeve couplings 58 to facilitate the vertical positioning of the block 57 and the upper rollers. A roller 62 (FIG. 1) is movably connected to the block 57 and cooperates with the platform member 16 in gripping the workpiece on the upper side thereof at the entrance to the bench 48.

A planing structure 65 (FIG. 6) is positioned at the exit of the bench 48. A lower planing drum 66 lies on the same plane as the group 49. The lower planing drum 66 is, along with a driving motor 68' therefor, secured to a plate 69' which is adjustable vertically by means of a handwheel and threaded shaft system 70' in relation to a stationary plate 71'. The upper planing drum 67 has its lower part on the same plane as the group 50 and is secured, together with the driving motor 68 therefor to a plate 69 which is adjustable vertically by means of a handwheel and threaded shaft system 70 in relation to a stationary plate 71 fixed to the block 57. The platforms 72 and 73 guide and clamp the workpiece therebetween and are adjustable adjacent the exit from the bench 48 and provide the support for the drums 66 and 67, respectively. The processing tools 74 and 74' (FIGS. 2 and 6), which have a substantially vertical axis, move at a right angle to the longitudinal axis of the bench 48 in the spacings 54 and 54' and are each secured to a movable slide 75 and 75' slidable on the stationary slideway 76 and 76'; respectively.

The tools consist of cutters or abrasive wheels or circular or pressure-pad type abrasive bands. The tools 74 and 74' are indexed to effect a finishing of the workpiece. For purposes of discussion, the processing tool 74' and indexing system 77' will be described, the processing tool 74 and indexing system 77 being identical thereto excepting the template 85. The same reference numerals will be used to identify corresponding parts but a prime suffix will be used to distinguish between the corresponding parts of the systems 77 and 77'. The indexing system 77' includes a horizontal support 78' (FIG. 4) which is secured to the movable slide 75' and has provided at its free outer end remote from the inwardly positioned end a tracer 79'. The lengthwise axis of the tracer 79' intersects the vertical axis of the tool 74'. The tracer 79' includes a feeler device 80 movably supported inside a supporting block 81'. The feeler device 80' has provided at one end thereof a small roller 82' (FIG. 4) which follows the contour 86' of a rotatably supported cam or template 85'. The feeler device 80' is fixedly attached to a bar 83' which in turn is attached to a stem of a reciprocal pin 102' of a control device 101', said pin 102' being axially movable against the force of a spring 103'. The position of the supporting block 81' can be adjusted longitudinally relative to the horizontal support 78' by means of a handwheel and threaded shaft unit 84'. The template 85' has a closed form, namely, a cylindrical-like shape, and its outer contour 86' corresponds functionally to the profile of the desired shape of the workpiece. All the irregularities of the profile are indexed on the template 85' as at 87'. The shaft 88' rotatably supporting the template 85' extends vertically. A cam or lug 89' is secured to the template 85' and cooperates by means of its front portion 91' with an arm of a switch 90' which controls the hydraulic motor 63' so as to slow down or speed up the motor 63' to suit the temporary positions of the tool 74' and profile 86'. An additional cam or lug 92' of the template 85' controls the loading device 10 by means of a microswitch 93'. A reduction gearing 95' is supported by an element 94' and is driven by one of the rollers 51 of the lower group 49 through a shaft 96' connected therebetween. The reduction gearing drives the template 85' by means of a changeable pair of gears 97' and 97''. The control device 101' and an oleodynamic amplifier 98', which includes a cylinder 100', are both integrally fixed to the slide 75' by means of a rod 99' of the cylinder 100'. The amplifier 98' transmits the radial variations on the cam 85', which are read by the feeler device 80' and transmitted to the control device 101' through the bar 83', to the tool 74'. An element 104' (FIG. 5) is the sample piece.

OPERATION

In operation, a workpiece is positioned in the loading device 10, the templates 85 and 85' are rotated, the respective lugs 92 and 92' activate the microswitch 93' which controls the hydraulic cylinder and piston units 33 (FIG. 3) and causes the closure of the jaws 27 and 27' on the workpiece positioned in the lowest position in the loading device 10. The microswitch 93' also activates the hydraulic cylinder and piston units 41 (FIG. 2) of the clutch device 34 which, by means of the lever 39, causes an axial movement of the coupling member 38 which is driven by the roller 55 of the group of rollers 49. The coupling member 38 moves axially and meshes with the coupling member 37, thus transmitting the rotary motion from the motor 63, and transmission 51A to the chain 20, which by means of the lug 21 and protrusion 22 moves the platform member 18, thus moving the workpiece gripped between the jaws 27 and 27' in a forward direction and slides it on and relative to the platform member 16.

During its approach to the entraining bench 48, the under surface of the workpiece is planed and grooved by the tool 46 since during this phase it is kept pressed against the tool 46 by the roller 62 engaging the upper surface thereof. Being grooved underneath, the workpiece moves between the groups of rollers 49 and 50 and is guided by the coordination of the grooves on the grooved rollers of the plane 49 with the grooves on the workpiece itself, and is drawn forwardly by the cooperation of the motion of the rollers of said groups of rollers 49 and 50 together with the pressure exerted on the upper surface of the workpiece by the upper rollers 50.

Having reached the end of its run, the platform member 18 activates a microswitch 45 (FIG. 2) which activates the hydraulic cylinder and piston units 33 and 41 in a reverse manner and opens the jaws 27 and 27', and disengages the coupling members 37 and 38 in the drive arrangement 34. The microswitch 35 also activates the pneumatic cylinder and piston unit 23 which moves the platform member 18 back to its starting position. The workpiece is then drawn by the rollers, at least initially, at the same speed as that at which it was introduced thereto.

During passage of the workpiece through the spacing 54, the workpiece is engaged by the tool 74. Tool 74 is supported for movement at right angles to the course travel of the workpiece to be shaped and occupies, in its progress, positions which depend strictly on the shape of the template 85 thereon. The workpiece, being drawn forward by the roller groups 49 and 50, is engaged on one side by the tool 74 and on the opposite side, when the workpiece reaches the spacing 54', by the tool 74' which is also controlled by a suitable template 85'.

At the exit from entraining bench 48, the workpiece is planed on both its lower and its upper sides by the pair of planing drums 66 and 67 in such a way that the guide grooves are removed therefrom.

Referring to FIG. 4, the contour 86' of the template 85' rotates with the shaft 88 and is engaged by the feeler device 80' to effect a movement thereof and a corresponding movement and displacement of the bar 83' and the pin 102' of the control device 101' which, by adjusting the flow of fluid to the cylinder 100', positions the slide 75'.

Whenever there is a recess 87' on the template 85' confronting the feeler device, the feeler device, being biased indirectly through the bar 83' by the spring 103', moves into the recess 87', thus allowing the pin 102' to move outwardly and through the amplifier 98, causing a return of the pin 99' and, therefore, a movement of the tool 74' and the tracer 79' toward the longitudinal center of the bench 48 until a new position of equilibrium is found. The opposite takes place where there is a protrusion on the outside edge 86' of the template.

By positioning the tracer 79' longitudinally by means of the handwheel 84', an adjustment of the depth of pass of the tool 74' is attained and, consequently, the width of the workpiece determined and worked. When the contour 86' of the template 85' includes some irregularities such as recesses 87', it is preferable to slow down the movement of the workpiece. This slowing down is preferably accomplished by causing the cam 89' to cooperate with the arm of a switch 90' controlling the hydraulic motor 63 at the same time as the feeler device 80' is moving within the portion of an irregular edge surface 87'. The shape of the profile 91' of the protrusion 89' adjusts the speed of the hydraulic motor 63 to a desired speed.

From practical tests carried out, it has been found that it is preferable to carry out the processing of the workpiece by starting on the simpler side and proceeding thereafter to the critical points. Thus, for example, the legs for the chair are obtained by processing the head thereof last.

The machine is also equipped to process parts having a variety of sizes. Thus, if it is desired to vary the length of the parts but to keep the profile constant and proportioned to the new length, it is possible to use the same template 85' and simply to change the ratio existing between the gears 97' and 97''.

If it is desired to vary the width of the workpieces, the guides 13 are adjusted laterally on the supports 12. Whereas, if the thickness is to be varied, the guides 13 are adjusted vertically relative to the supports 12 and at the same time it is necessary to adjust, by means of the handwheel 60, the group of rollers 50 relative to the rollers of the group 49. Thus, by turning the handwheel 17, the position of the platform member 16 is adjusted and, thus, the depth of the grooves is adjusted. Similarly, by positioning the surface 73 at the exit of the bench 48 by means of the handwheels 70 and 70', the adjustment of the position of the planing drums 67 and 66, respectively, is obtained.

If a different profile is desired, the template 85 and 85' is replaceable. Whenever it is desired to emphasize the lengthwise irregularities in the finished part, it is possible to use large diameter templates. These templates 85 and 85' are made by using the same machine. For this purpose, the arms 105 (FIG. 5), one per template and two, one per each workable side of the future workpiece, are fixed to the sliding blocks 109 mounted on the horizontal support 78. In place of the templates 85 and 85', a supporting board or plate 185 is fixed, then the sample piece 104 is inserted between the groups of rollers 49 and 50. The sample piece passes along the bench 48 and is felt by the feeler end 106 of the arms 105 which causes said arms 105 to move at right angles to the longitudinal axis of the bench 48, thus making the milling tools 107 move radially relative to the rotatably supported boards 185 and 185'. The milling tools 107 cut the peripheral edges of the boards 185 and 185' and produce the templates 85 and 85'.

The above describes a preferred embodiment of the invention. However, variants are possible without departing thereby from the essence of the invention. Thus, it is possible to vary the proportions and sizes; it is also possible to replace the cams 89 and 89' a template of a suitable shape integrally fixed to said templates 85 and 85' to obtain continuous adjustment of the speed of forward movement. In this case, a template would be needed to regulate the speed on only one of the indexing systems 77 and 77'. It is also possible to use some hydraulic, pneumatic and electrical positioning means in place of the manual mechanical positioning means. Similarly, it is possible to use spring means instead of the piston means 53. It is possible also to envisage that the tool should move at an angle in respect of the plane lying at right angles to the forward movement of the workpiece. It is also possible to use a controlled or controllable electric motor instead of the hydraulic motor 63. Thus, too, the indices 77 and 77' of a mechanical type can be replaced with electronic magnetic tape or disk indices or with mechanical indices using a circular cam but operating frontally and not at right angles. It is also possible to arrange the grooving means 46 on the upper platform, etc. These and other variants are possible without departing thereby from the scope of the concept disclosed.

The embodiments of the invention in which an exclusive property or privilege is claimed are defined as follows:

1. A machine for the production of shaped parts by means of material removing tools, said machine comprising in combination a one-directional entraining, guiding and processing bench having drive means thereon for driving said parts longitudinally along the longitudinal axis thereof; indexing means for controlling at least one of said material removing tools for movement at right angles to said longitudinal axis into and out of engagement with said parts; planing and grooving tool means positioned at the entry to said bench; loading means for feeding said parts to said planing and grooving means; and planing means at the exit of said bench for planing said parts prior to exit from the machine.

2. The machine according to claim 1, wherein said loading means comprises in combination a first platform having a longitudinally extending loading surface positioned substantially at a tangent to said planing and grooving means; and a second movable platform which moves longitudinally of the machine and includes means for clamping and centering the parts relative to said bench and wherein said first platform includes means for facilitating at least a partial adjustment in respect of its height relative to said bench.

3. The machine according to claim 2, wherein said second platform of said loading means includes means for forward movement consisting of a clutch attached to said entraining bench which causes axial movement of a first coupling member which meshes with a second coupling member and transmits rotary motion to a chain secured to said second platform, and wherein the disengagement of said clutch is controlled by hydraulic elements and a pneumatic system which returns said second platform to its starting position.

4. The machine according to claim 1, wherein the entraining, guiding and processing bench comprises in combination a group of grooved motive rollers, and a group of smooth motive rollers, wherein said grooved motive rollers cooperate with said planing and grooving means and wherein the vertical position of the two groups are adjustable.

5. The machine according to claim 1, wherein said material removing tools are controlled in such a way that they move at right angles to the entraining bench, the control for said movement being by an indexing means.

6. The machine according to claim 4, wherein the indexing means consists essentially of a rotating template whose edge cooperates with a reader-tracer means connected functionally to said tool, wherein the rotation of said template is coordinated functionally with that of said motive rollers.

7. The machine according to claim 6, including motion amplifying means for converting a first movement into a proportioned second movement and wherein said reader-tracer means consists of a movable feeler device which cooperates at one end with the edge of the template to produce said first movement and at the opposite end with rigid means transmitting its motion to said amplifying means to effect the production of said second movement.

8. The machine according to claim 7, wherein feeler means for controlling the speed of said drive means and wherein said template includes a first cam, the profile of which engages said feeler means to alter the speed of movement of said parts through said bench.

9. The machine according to claim 7, wherein said loading means comprises in combination a first platform having a longitudinally extending loading surface positioned substantially at a tangent to said planing and grooving means; and a second movable platform which moves longitudinally of the machine and includes means for clamping and centering the parts relative to said bench; wherein said first platform includes means for facilitating at least a partial adjustment in respect of its height relative to said bench and wherein said template has lug means thereon for effecting an actuation of said clamping and centering means.

10. The machine according to claim 2, wherein said planing and grooving means consist of a set of laterally spaced cutters, cooperating at their top with a roller connected to said entraining, guiding and processing bench.

11. The machine according to claim 4, wherein said bench consists of at least one drum cooperating with a set of grooved rollers.

* * * * *